Nov. 28, 1961  J. V. LE BLANC  3,011,105
COOLED RECTIFIER ASSEMBLY
Filed Dec. 30, 1958  2 Sheets-Sheet 1

Inventor:
Joseph V. LeBlanc,
by J. Wesley Haubner
His Attorney.

Nov. 28, 1961   J. V. LE BLANC   3,011,105
COOLED RECTIFIER ASSEMBLY
Filed Dec. 30, 1958   2 Sheets-Sheet 2

Inventor:
Joseph V. LeBlanc,
by J. Wesley Haubner
His Attorney.

United States Patent Office 3,011,105
Patented Nov. 28, 1961

3,011,105
COOLED RECTIFIER ASSEMBLY
Joseph V. Le Blanc, Lynchburg, Va., assignor to General Electric Company, a corporation of New York
Filed Dec. 30, 1958, Ser. No. 783,849
9 Claims. (Cl. 317—234)

This invention relates to electrical rectifying equipment and more particularly to air cooled rectifying assemblies including a plurality of dry rectifying cells or elements.

In converting alternating currents to direct currents the rectifying cells in power supplies may generate large amounts of heat which must be dissipated as fast as generated or the cells will overheat and be destroyed. The present disclosure concerns those power rectifying arrangements wherein the necessary cooling of the dry cells must be carried out in a very limited space and with equipment weighing as little as possible. As might be expected, equipment of this nature is of particular utility in aircraft installations where available space and allowable weight are ever present design considerations.

It is therefore an object of this invention to provide an improved air cooled rectifier assembly having minimum size and weight but which nevertheless assures adequate heat transfer from the rectifying cells in operation.

By way of a summary account of one form of the present invention, I provide a unique heat exchange frame having a central portion which has the shape of a cylinder with a plurality of cooling arms extending outwardly from the outer surface thereof in longitudinal planes and terminating at a surrounding housing which is also of generally cylindrical shape. On each of the cooling arms in heat exchanging relationship therewith a rectifying cell of the dry or semi-conductor type is mounted. Within the cylindrical central portion of the heat exchange frame a fan motor is mounted with its rotational axis coincident with the longitudinal axis of the cylinder. A fan blade mounted at one end of the motor extends beyond the cylindrical central portion in a position to direct a cooling stream of air across the surfaces of the cooling frame and rectifier cells in an axial direction. Elsewhere within the surrounding housing additional required electrical elements are mounted with electrical connections made between them and the individual rectifying cells. In spite of its very desirable compactness and small weight the entire arrangement offers an adequate amount of cooling for the rectifying elements and is particularly suitable for airborne power supplies.

Further details of the invention as well as additional objects and advantages will be better understood in connection with the accompanying drawings wherein.

Figure 1:
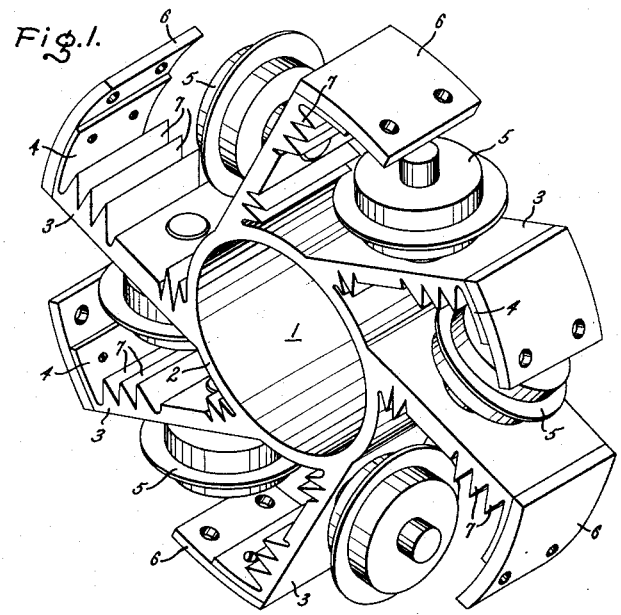
FIG. 1 is a perspective view of a heat exchange frame constructed in accordance with the present invention with rectifying cells mounted thereon.

The heat exchange frame 1 shown in FIG. 1 comprises a cylindrical central portion 2 from the outer surface of which extend six cooling arms 3. In this example the cooling arms extend tangentially away from the surface of the central portion in planes parallel to the longitudinal axis of the cylinder and terminate at mounting feet 4 located equidistant away from the cylindrical central portion. Each cooling arm has a rectifying element or cell 5 mounted upon it in intimate heat exchange relationship so that the entire frame constitutes a heat sink for the cells to dissipate the heat developed during their periods of conduction. These rectifying elements as shown are of a construction usually identified with silicon cells in which a wafer of silicon is enclosed within a sealed housing with power leads projecting therefrom, although other dry plate types of rectifier cells such as germanium, selenium or copper oxide may also be used. Since one electrical terminal of such devices generally has a mounting stud of substantial size associated therewith to achieve a maximum heat transfer from the cell to the surrounding cooling medium, the heat exchange frame to which the mounting studs are fastened may also serve as a bus structure to conduct the rectified electrical currents. At the outer end of each cooling arm is attached an insulating spacer 6 for attachment of the frame to an external housing not shown in FIG. 1. Also on each arm a series of projections or cooling fins 7 maximize the surface area of each cooling arm to aid in a transfer of heat into the surrounding medium.

Figure 2:
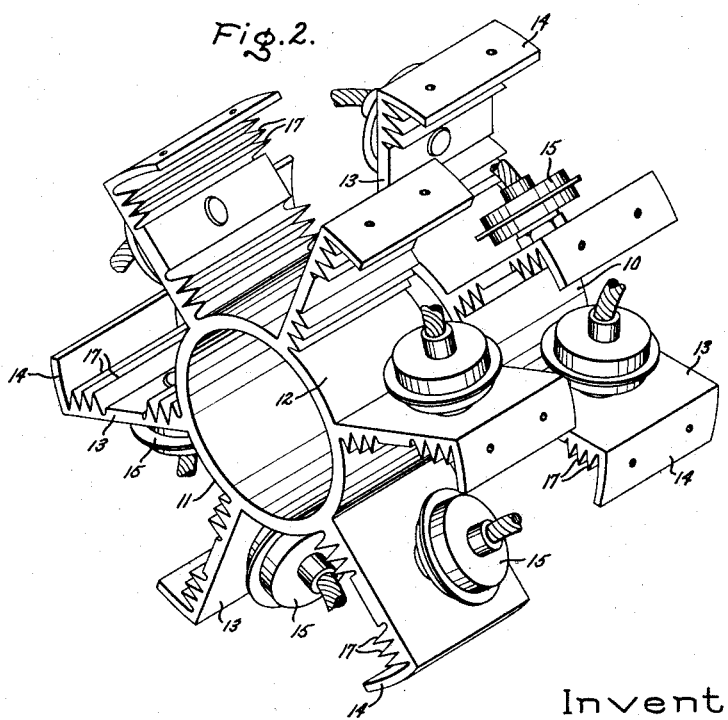
FIG. 2 is a perspective view of a pair of staggered heat exchange frames of alternate form constructed in accordance with the present invention.

In FIG. 2 there is illustrated an arrangement wherein at least two heat transfer members are employed, these being physically and electrically separated. In some circuitry electrical isolation of cells is essential. Furthermore, a larger number of cells may be accommodated in a housing of a given diameter with a multiple construction of this type. It should be noted that the two heat exchange frames 10 and 11 each include a cylindrical central portion 12 with cooling arms 13 extending radially outwardly therefrom instead of tangentially and that the two heat exchange frames are angularly displaced with respect to one another to maximize the cooling effects obtained. As in the previous example each cooling arm has mounted on it a rectifying cell 15. The cooling arms in FIG. 2 are also provided with terminal mounting feet 14 and with longitudinal projections or serrations 17 to aid in the cooling function.

Figure 3:
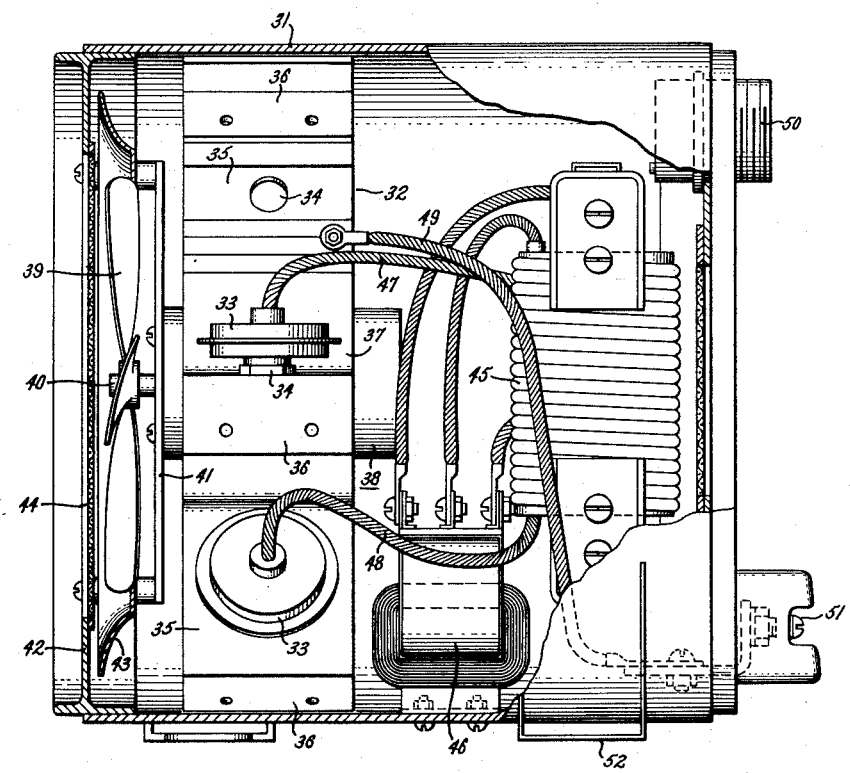
FIG. 3 is a plan view partially in section of an air cooled rectifier assembly constructed in accordance with this invention and embodying a heat exchange frame of the type shown in FIG. 2.

The incorporation of a single heat exchange frame of one of the foregoing types with a rectifier array mounted thereon into a complete air cooled rectifier assembly in accordance with this invention is shown in FIG. 3. This assembly includes an outer cylindrical housing 31 enclosing a heat exchange frame 32 of the type described with rectifying cells 33 mounted thereon. The rectifying cells are secured to the frame by suitable studs 34 which pass through each of the cooling arms 35 in intimate electrical and thermal contact therewith. A circumferentially extending portion 36 at the outer end of each cooling arm provides a mounting foot to fasten the heat exchange frame securely within the outer housing. Nested centrally within the cylindrical central portion 37 of the heat exchange frame is an electric motor 38 whose axis of rotation is coincident with the longitudinal axis of the cylinder and housing.

At one end of the motor a fan blade 39 is affixed to the motor shaft 40 in such a way as to direct an air stream axially through the heat exchange frame and rectifier array. For this purpose it should be noticed that the fan blade extends considerably beyond the cylindrical central portion of the heat exchange member. The fan motor itself is preferably independently mounted by means of a bracket 41 attached to an annular plate 42 closing the front or intake side of the outer housing, and clearance is provided between the motor and the cylindrical central portion of the heat exchange frame. This arrangement minimizes heat transfer from the motor outward through the frame, for the motor is cooled directly by the air circulated past it by the fan blade. A wind shroud 43 mounted about the fan blade increases its efficiency and a screen or grid 44 covering the opening in the annular plate 42 prevents damage to the fan blade by the entry of foreign bodies.

In the space behind the heat exchange frame and the rectifier array but inside of the outer cylindrical housing are included additional rectifier assembly components such as a three phase transformer 45 shown only in side view and an interphase transformer 46 which in and of themselves do not constitute part of the present invention. Some, but not all, of the circuit connections in this part of the housing are shown including the flexible cables 47 and 48 connected to two of the rectifier cells and cable 49 connected to the heat exchange frame. Through these and other circuit conductors not shown electrical connections may be made to the various elements of the rectifier assembly, to terminals in a connecting plug 50 and to the output terminal 51 opening on the outside of the cooled rectifier assembly.

The entire cooled rectifier assembly is thus seen to be in the form of a neat cylindrical package which may be mounted in any desired orientation. Toward this end brackets 52 may be affixed to the outside of the housing for attachment to horizontal or vertical mounting surfaces. Even the outer housing 31 may constitute part of the heat dissipating means and, if so, a good thermal contact will be desired between the outer ends of the cooling arms and the internal surfaces of the outer housing. For this purpose it may be important to fasten the ends of the cooling arms directly to the cylindrical housing. Conversely, if the heat exchange frame should not, as in certain circuits, be grounded, insulating spacers such as those identified by reference numerals 6 in FIG. 1 may be inserted between the housing and the heat exchange frame.

Different factors may govern the choice between a heat exchanger with tangential cooling arms such as that shown in FIG. 1 or one with radially extending cooling arms such as shown in FIG. 2. For a given diameter of the outer housing the tangential orientation of the outwardly projecting cooling arms shown in FIG. 1 permits a greater length of the arm and therefore a greater surface area to be exposed to circulating air currents. On the other hand if the air cooled rectifier assembly is permitted to occupy a larger volume the radial grouping of cooling arms shown in FIG. 2 will usually offer less physical resistance to the air directed through it.

While I have shown certain specific embodiments herein it will be apparent that these are intended only as illustrative of the principles of the present invention. Other variations in shape and arrangement within the true spirit and scope of this invention will doubtless occur to those skilled in the art to which the invention pertains.

What I claim as new and desire to secure by Letters Patent of the United States is:

1. An air cooled rectifier assembly comprising a cylindrical container; a heat exchange frame mounted axially within said container having a generally cylindrical hollow central portion with cooling plates extending outwardly therefrom in generally longitudinal planes and terminating at said cylindrical container; at least one electrical rectifying cell mounted on each of said plates in heat exchanging relationship therewith; a motor mounted within the hollow central portion of said frame having a motor shaft whose axis of rotation is coincident with the longitudinal axis of said heat exchange frame; and a fan blade mounted on said motor shaft at one end of said heat exchange frame to direct air longitudinally over said cooling plates and rectifying cells.

2. An air cooled rectifier assembly comprising a cylindrical container; a heat exchange frame mounted axially within said container having a generally cylindrical hollow central portion with plates extending outwardly therefrom in generally longitudinal planes and terminating at said cylindrical container; at least one electrical rectifying cell mounted on each of said plates in heat exchanging relationship therewith; a motor mounted within the hollow central portion of said frame; and a fan blade operated by said motor and arranged at one end of said heat transfer frame to direct air longitudinally past said plates and rectifying cells.

3. An air cooled rectifier assembly comprising a cylindrical container; a heat exchange frame mounted axially within said container having a central portion with cooling plates extending outwardly therefrom in generally longitudinal planes equiangularly spaced about said central portion and terminating at said cylindrical container; at least one electrical rectifying cell mounted on each of said plates in heat exchanging relationship therewith; and means at one end of said heat exchange frame for directing a cooling air current longitudinally over the surfaces of said plates.

4. An air cooled rectifier assembly comprising an outer housing; a heat exchange frame mounted within said housing and having a cylindrical central portion with a continuous periphery and open ends; and a plurality of generally planar cooling arms situated equiangularly about said cylindrical central portion and extending outwardly therefrom in planes parallel to the longitudinal axis of said cylindrical portion; an electrical rectifying cell mounted on each of said cooling arms in heat exchanging relationship therewith; a motor mounted within the hollow central portion of said frame; and a fan blade operated by said motor and arranged at one end of said heat exchange frame to direct air axially through said heat exchange frame across said cooling arms and said rectifying cells.

5. An air cooled rectifier assembly comprising an outer housing; a heat exchange frame mounted within said housing and having a cylindrical central portion with a continuous periphery and open ends; and a plurality of generally planar cooling arms situated equiangularly about said cylindrical central portion and extending outwardly therefrom in planes tangential to the surface of said cylindrical portion; an electrical rectifying cell mounted on each of said cooling arms in heat exchanging relationship therewith; a motor mounted within the hollow central portion of said frame; and a fan blade operated by said motor and arranged at one end of said heat exchange frame to direct air axially through said heat exchange frame across said cooling arms and said rectifying cells.

6. An air cooled rectifier assembly comprising an outer housing; a heat exchange frame mounted within said housing and having a cylindrical central portion with a continuous periphery and open ends; and a plurality of generally planar cooling arms situated equiangularly about said cylindrical central portion and extending radially outwardly therefrom in planes parallel to the longitudinal axis of said cylindrical portion; an electrical rectifying cell mounted on each of said cooling arms in heat exchanging relationship therewith; a motor mounted within the hollow central portion of said frame; and a fan blade operated by said motor and arranged at one end of said heat exchange frame to direct air axially through said heat exchange frame across said cooling arms and said rectifying cells.

7. A heat exchange frame for an air cooled rectifier assembly comprising a cylindrical central portion having a continuous imperforate periphery and open ends to provide for axially directed flow of cooling air through said central portion; a plurality of generally planar cooling arms situated equiangularly about said cylindrical central portion and extending outwardly therefrom in planes parallel to the longitudinal axis of said cylindrical portion; and means for mounting an electrical rectifying cell on each of said cooling arms.

8. A heat exchange frame for an air cooled rectifier assembly comprising a cylindrical central portion having a continuous imperforate periphery and open ends to provide axially directed flow of cooling air from end to end through said central portion; a plurality of generally planar cooling arms situated equiangularly about said cylindrical central portion and extending outwardly therefrom in planes tangential to the surface of said cylindrical central portion; and means for mounting an electrical rectifying cell on each of said cooling arms.

9. A heat exchange frame for an air cooled rectifier assembly comprising a cylindrical central portion having a continuous imperforate periphery and open ends to provide axially directed flow of cooling air from end to end through said central portion; a plurality of generally planar cooling arms situated equiangularly about said cylindrical central portion and extending radially outwardly therefrom in planes parallel to the longitudinal axis of said cylindrical portion; and means for mounting an electrical rectifying cell on each of said cooling arms.

References Cited in the file of this patent

UNITED STATES PATENTS

| | | |
|---|---|---|
| 2,143,919 | Kotterman | Jan. 17, 1939 |
| 2,412,989 | Kotterman | Dec. 24, 1946 |